Oct. 22, 1957 L. R. WALKER 2,810,882
METHOD AND APPARATUS FOR MEASURING SATURATION MAGNETIZATION
OF SMALL FERROMAGNETIC SPECIMENS
Filed March 13, 1956

INVENTOR
L. R. WALKER
BY
*H. O. Wright*
ATTORNEY 2,810,882
Patented Oct. 22, 1957

2,810,882

METHOD AND APPARATUS FOR MEASURING SATURATION MAGNETIZATION OF SMALL FERROMAGNETIC SPECIMENS

Laurence R. Walker, Bernardsville, N. J., assignor to Bell Telephone Laboratories, Incorporated, New York, N. Y., a corporation of New York Application March 13, 1956, Serial No. 571,227

6 Claims. (Cl. 324—58.5)

This invention relates to a method and apparatus for determining the saturation magnetization of small ferromagnetic specimens of low conductivity. More particuarly it relates to a simple method, and simple arrangements for practicing said method, whereby the saturation magnetization of very small ferromagnetic specimens of low conductivity can be easily measured with good accuracy.

Low conductivity, for the purposes of the present application, is defined as descriptive of materials having a resistivity of at least 10 ohm-centimeters.

Methods and apparatus of the prior art for measuring saturation magnetization are complex and expensive and require the use of costly specialized equipment and of specimens of relatively large size.

In view of recent developments making use of minute spheres or discs cut from a single crystal of a ferromagnetic material of low conductivity, a method permitting the reasonably accurate measurement of the saturation magnetization of minute specimens and requiring only the facilities normally available in a moderately well-equipped laboratory would appear to be of very substantial merit.

Illustrative of one type of the above-mentioned recent developments are the disclosures of the copending applications of J. F. Dillon, Jr. Serial No. 571,226, and A. M. Clogston, Serial No. 571,185, both filed concurrently, on March 13, 1956, with the present application and assigned to applicant's assignee.

In the determination of the ferromagnetic resonance absorption characteristics of specmens in the prior art, it has been customary to place a spherical specimen in a unidirectional magnetizing field of predetermined direction and to subject the specimen to a uniform high frequency or microwave field directed at right angles to the unidirectional field.

The intensity of the unidirectional field is preferably in excess of the intensity required to magnetically saturate the specimen since the resonance absorption phenomenon will be more pronounced and hence more readily perceived.

Either the intensity of the magnetizing field or the frequency of the high frequency field can then be varied until the phenomenon of ferromagnetic resonance absorption takes place.

Under the circumstances described immediately above, and for moderate power level operation (see the copending application of H. Suhl, Serial No. 553,960 filed December 19, 1955, for a description of the effects of high level operation), a single ferromagnetic resonance absorption peak will normally be observed. In general, for appreciably different fixed magnetizing field intensities the frequency regions in which this single resonance occurs will be appreciably different or, conversely, for appreciably different fixed frequencies the magnetizing field intensities at which the single resonance occurs will be appreciably different. In other words the two factors are interrelated in that for a given fixed frequency the resonance will always occur at the same magnetizing field values, and vice versa.

This general relation is expressed by the equation $$H_0 = \frac{\omega}{\gamma} + (N_z - N_t)4\pi M_0 + H_a \quad (1)$$

where $H_0$ is the magnetizing field intensity; $\omega = 2\pi f$, where $f$ is the frequency of the high frequency field; $\gamma$ is the gyromagnetic ratio; $M_0$ is the saturation magnetization; $N_z$ is the axial demagnetizing factor; $N_t$ is the transverse demagnetizing factor; and $H_a$ is an anisotropy field, which can be completely disregarded if the specimen is aligned in the cavity so that the magnetizing field is parallel to either an "easy" or a "hard" direction of magnetization with respect to the structure of the single crystal from which the specimen is cut. Other orientations of the specimen in the cavity will under the least favorable situations introduce an error of only a few percent so that for most purposes the orientation need not be meticulously adjusted.

As will presently become apparent, aside from the anisotropy effect discussed above, only the term including the demagnetizing factors need be taken into consideration for the purposes of the present invention.

For a small spherical specimen in a uniform high frequency field $$N_z = N_t = \frac{1}{3}$$

and $$H_{0_1} = \frac{\omega}{\gamma} + H_a \quad (2)$$

where $H_{0_1}$ is the magnetizing field intensity for "normal" resonance which occurs under the conditions postulated immediately above. These conditions correspond to resonance at the fundamental mode, i. e. $m=1$, as will be discussed in more detail presently.

If a small spherical specimen, cut from a single crystal of a ferromagnetic material of low conductivity, in the presence of the above-mentioned unidirectional magnetizing field, is subjected to a radio or microwave frequency field which is substantially uniform along the axis of the sphere which is parallel to the unidirectional field, the microwave field being non-uniform, but symmetrically so, about said axis, then a single ferromagnetic resonance absorption peak will still occur, but at a different intensity of said unidirectional magnetizing field than for the case of so-called "normal" or fundamental mode resonance in a uniform microwave field in the vicinity of said specimen. In other words for each of a plurality of particular conformations or modes, of the microwave frequency field in the vicinity of the sample or specimen, a ferromagnetic resonance absorption peak occurring at a particular intensity of the unidirectional magnetizing field will occur and the intensity of the magnetizing field will be significantly different for each mode.

The resonances of interest in connection with the present invention are the so-called "normal" resonance and several of the above-described "mode" resonances occurring in relative proximity to the "normal" resonance.

The magnetizing field intensities at which the several "mode" resonances occur can each be calculated using Equation 3 below, provided, as indicated above, that the non-uniform high frequency field does not vary along an axis through the specimen having the direction of the magnetizing field and the high frequency field has an $m$-fold symmetry about said axis. For these conditions $$H_{0_m} = \frac{\omega}{\gamma} + (N_z - N_{t_m})4\pi M_0 + H_a \quad (3)$$

where $H_{0_m}$ is the magnetizing field intensity for any

"mode" $m$, and $Nt_m$ is the corresponding transverse demagnetizing factor.

The "normal" or fundamental mode ferromagnetic resonance absorption peak as mentioned above, corresponds to the fundamental or first mode i. e. $m=1$, which, of course, requires a uniform high frequency field in the vicinity of the specimen, and successive minor or subsidiary resonances take place at values for $m$ of 2, 3, etc.

It can be demonstrated that for a spherical test specimen $$N_{t_m} = \frac{1}{2m+1} \quad (4)$$

whence $$H_{0_1} - H_{0_m} = \left(\frac{1}{3} - \frac{1}{2m+1}\right)4\pi M_0$$
$$= \frac{2(m-1)}{3(2m+1)}4\pi M_0 \quad (5)$$

Accordingly it is apparent that successive subsidiary resonances occur at magnetizing field intensities such that the right hand side of Equation 5 assumes the values $$\frac{2}{15}(4\pi M_0); \frac{4}{21}(4\pi M_0); \text{ etc.}$$

The intervals are, obviously, dependent only upon the magnetization and are independent of the amplitude of the applied high frequency field, the frequency of the latter field and, within limitations indicated hereinabove, of the anisotropy of the material. It is therefore only necessary to determine the intensity of the magnetizing field $H_{0_1}$ required to produce the normal or fundamental mode resonance and that $H_{0_m}$ required to produce the next adjacent mode resonance, $(m=2)$. However to check the consistency of the measurements it is well to also measure the magnetizing field $H_{0_m}$ for one or more successive resonances such as those for $(m=3)$ and $(m=4)$. The values of magnetizing field thus found should of course, be substantially identical.

In accordance with the above, the principal object of the invention is to facilitate the measurement of the saturation magnetization of small specimens of ferromagnetic material of low conductivity.

Another object is to simplify and to reduce the expense incident to the measurement of the saturation magnetization of small specimens of ferromagnetic material of low conductivity.

Other and further objects, features and advantages of the invention will become apparent during the course of the following description and from the appended claims.

In the accompanying drawings—

Figure 1:
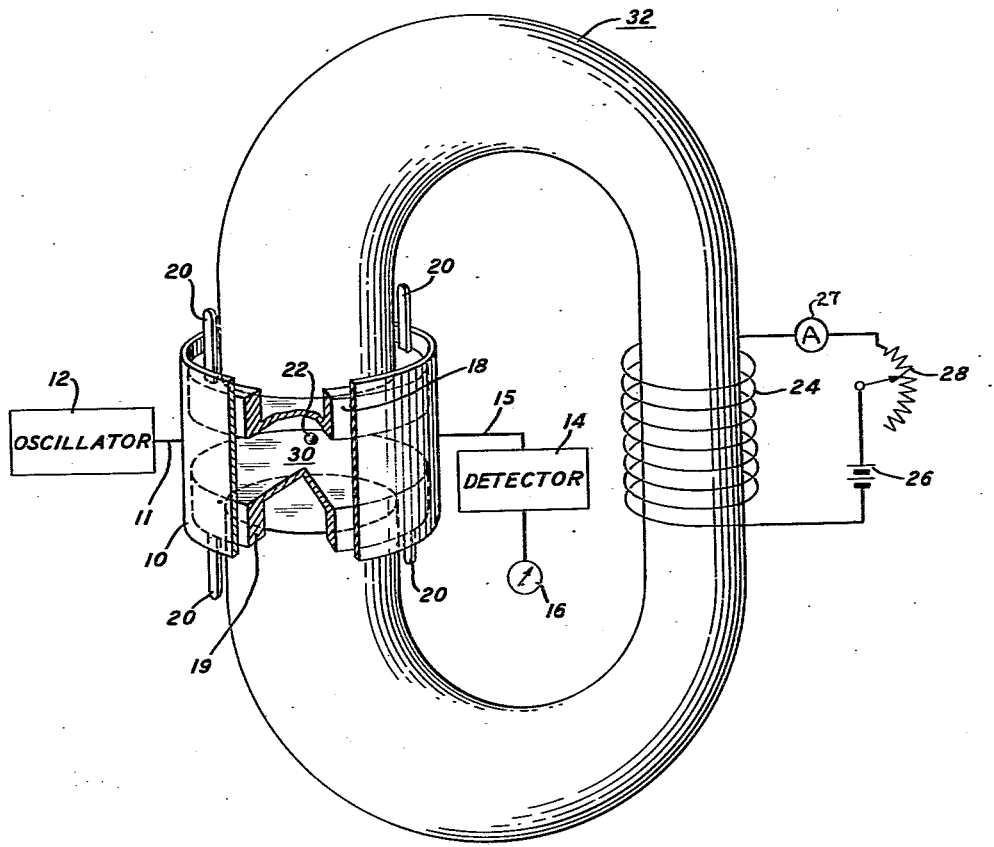
Fig. 1 shows in schematic block diagram form an arrangement for testing ferromagnetic specimens of low conductivity in accordance with the principles of the present invention.

In more detail in Fig. 1, a cylindrical cavity 30 is formed by inserting pistons 18 and 19 in the upper and lower ends, respectively, of the cylindrical section of wave guide 10.

A spherical sample or specimen 22 of a ferromagnetic material of low conductivity is positioned at the center point of cavity 30.

A vertically-directed, unidirectional magnetizing field is provided, between the upper and lower poles of magnet yoke 32, by passing current through magnetizing coil 24 from a direct current source 26 connected in series with a potentiometer 28. The intensity of the magnetizing field can obviously be adjusted by adjustment of potentiometer 28. An ammeter 27 is preferably included in series with potentiometer 28 to facilitate determination of the field strength adjustment for any setting of the potentiomer.

A microwave frequency field is established within cavity 30 by microwave oscillator 12 which is connected as shown to a point near the central plane of cavity 30, by section of transmission line 11. Line 11 is preferably also a section of wave guide coupled by an iris to cavity 30.

A detector 14 is connected, via transmission line 15, to a point also near the central plane of cavity 30 and symmetrically located with respect to the coupling point for oscillator 12. Again line 15 is preferably a section of wave guide coupled by an iris to cavity 30. An indicator 16 coupled to the output of detector 14 serves to provide an indication of the amplitude of the energy reaching detector 14.

Figure 2:
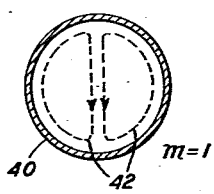
Fig. 2 illustrates the microwave frequency field configuration in a centrally located cross section of cylinder 10 of Fig. 1 for the "normal" mode, i. e. $m=1$.
Figure 3:
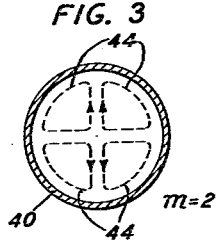
Fig. 3 illustrates the corresponding microwave frequency field configuration for the mode $m=2$.
Figure 4:
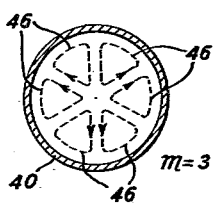
Fig. 4 illustrates the microwave frequency field configuration for the mode $m=3$.

By moving piston 18 upwardly and piston 19 an equal amount downwardly by means of handles 20, various modes of oscillation of the microwave energy from oscillator 12 can be induced in cavity 30, corresponding, for example, to the modes $m=1$, $m=2$, and $m=3$ as illustrated in Figs. 2 through 4, respectively.

In accordance with the principles of the invention as described in detail hereinabove, the cavity 30 is successively adjusted to vertical dimensions such that the modes of oscillation illustrated by Figs. 2 through 4, respectively, are generated in cavity 30, the upper and lower pistons being moved equally so that specimen 22 is always at the center point of cavity 30 for each mode. At each successive cavity adjustment position the intensity of the unidirectional magnetizing field is adjusted by potentiometer 28 to determine its value required to produce a ferromagnetic resonance absorption peak. The values obtained are then of course employed in the equations for the appropriate respective modes as described in detail above, and the saturation magnetization of the sample determined.

By way of specific example, for a testing frequency of 9400 megacycles, and a cylinder diameter of substantially three inches, the cylinder height between pistons 18 and 19 for the various modes of oscillation should be as follows:

| Mode | $m=1$ | $m=2$ | $m=3$ |
|---|---|---|---|
| Height | .73" | .87" | 1.21" |

Alternatively, it is entirely within the knowledge and capabilities of those skilled in the art to design a single resonant cavity which will produce microwave frequency fields of the several desired configurations at a like plurality of positions within the cavity so that the specimen may be placed at said different positions in succession and the intensity of the unidirectional magnetizing field required to produce a ferromagnetic resonance absorption peak determined for each position of the specimen and the data thus obtained can then, obviously, be employed to determine the saturation magnetization of the sample.

As a further alternative, those skilled in the art can also design a cavity in which the several field configurations for the several modes all exist simultaneously at a predetermined point in the cavity so that by positioning the specimen at that point it is only necessary to vary the intensity of the unidirectional magnetizing field to discover the respective resonances for each mode, and the data thus obtained is obviously suitable for determination of the saturation magnetization of the sample.

Whatever arrangements are employed the diameter of the specimen employed should be small with respect to a wavelength of the microwave frequency at which the tests are conducted. In general, for maximum accuracy, the diameter of the specimen should preferably be only a few percent of said wavelength.

Numerous and varied arrangements and applications within the spirit and scope of the principles of the present invention will readily occur to those skilled in the art. No attempt to exhaustively illustrate all such arrangements and applications has been made hereinabove.

What is claimed is:

1. The method of measuring the saturation magnetization of a small specimen of ferromagnetic material at microwave frequencies, said method comprising subjecting said specimen to a unidirectional magnetizing field, simultaneously subjecting said specimen to a microwave frequency field directed at right angles to said magnetizing field, changing the configuration of said microwave frequency field in the vicinity of said specimen successively to correspond to normal ferromagnetic resonance in a uniform field and to one or more successive resonances at specific differing angular symmetrics of said field, respectively, adjusting said unidirectional field at each configuration of said microwave frequency field to the value required to produce resonance at said configuration, detecting said resonance and measuring the strength of said unidirectional field at each said microwave field configuration, respectively, whereby the saturation magnetization of said specimen can be determined.

2. Means for measuring the saturation magnetization of a small specimen of ferromagnetic material at microwave frequencies, said means comprising means for subjecting said specimen to a unidirectional magnetizing field, means for adjusting the intensity of said unidirectional field, means for simultaneously subjecting said specimen to a microwave frequency radio field directed normally with respect to said magnetizing field, means for successively adjusting the configuration of said microwave frequency field to conform to predetermined oscillation modes of successively increasing complexity and means for determining the intensity of said unidirectional magnetizing field required to produce a ferromagnetic resonance absorption peak at each of said successive configurations of said microwave frequency field whereby the saturation magnetization of said sample can be determined.

3. The means of claim 2 in which said means for adjusting the configuration of said microwave frequency field comprises a cylindrical cavity the length of which can be adjusted at each end of said cavity.

4. Means for use in measuring the saturation magnetization of a small specimen of ferromagnetic material at microwave frequency which includes a cavity formed by a cylindrical member and movable piston closures at each end of said member, an electromagnet arranged to direct its field along the axis of said cavity, a source of direct current, a potentiometer, said source being connected through said potentiometer to the coil of said electromagnet, a microwave oscillator, a microwave detector, said oscillator and said detector both being coupled to the central portion of said cavity to generate and detect, respectively, microwave frequency waves directed normally to the axis of said cavity, and an indicator connected to said detector, whereby a specimen placed at the center of said cavity can be simultaneously subjected to a unidirectional magnetizing field of adjustable intensity directed along the axis of said cavity and any one of a plurality of microwave frequency field configurations corresponding to a like plurality of lengths of said cavity directed normally to the axis of said cavity, and the intensity of said unidirectional field required to produce a ferromagnetic resonance absorption peak for each of the specific microwave frequency field configurations employed can be determined.

5. The method of measuring the saturation magnetization of a specimen of ferromagnetic material at microwave frequencies, said method comprising subjecting said specimen to a plurality of microwave frequency electromagnetic fields of specific differing configurations directed parallel to a predetermined plane, subjecting said specimen to a unidirectional magnetizing field directed perpendicularly with respect to said plane, adjusting the intensity of said unidirectional field to produce, successively, a like plurality of main ferromagnetic resonance absorption peaks, or maximums, detecting said absorption peaks and measuring the strength of said unidirectional field at each said peak, respectively, whereby the saturation magnetization of said specimen can be determined.

6. The means of claim 4 and a test specimen of spherical form having a diameter which is small with respect to the wavelength of said microwave frequency waves, positioned centrally within said cavity.

References Cited in the file of this patent

UNITED STATES PATENTS 2,671,884    Zaleski _____ Mar. 9, 1954